US 8,433,613 B2

(12) United States Patent
Crim

(10) Patent No.: US 8,433,613 B2
(45) Date of Patent: Apr. 30, 2013

(54) WEB SITE AUDIO/VIDEO PRESENTATION SYSTEM

(75) Inventor: Steven Crim, Fairhope, AL (US)

(73) Assignee: C and S Net, Inc., Fairhope, AL (US)

( * ) Notice: Subject to any disclaimer, the term of this patent is extended or adjusted under 35 U.S.C. 154(b) by 338 days.

(21) Appl. No.: 12/099,782

(22) Filed: Apr. 8, 2008

(65) Prior Publication Data

US 2008/0189615 A1 Aug. 7, 2008

Related U.S. Application Data

(63) Continuation of application No. 11/465,409, filed on Aug. 17, 2006.

(51) Int. Cl.
*G06Q 30/00* (2012.01)
*G05B 19/418* (2006.01)

(52) U.S. Cl.
USPC ........ 705/14.73; 715/716; 715/856; 705/27.1

(58) Field of Classification Search ............... 705/14, 705/27.1; 715/716, 856
See application file for complete search history.

(56) References Cited

U.S. PATENT DOCUMENTS

| 6,816,880 B1 * | 11/2004 | Strandberg et al. .......... 709/202 |
| 7,386,473 B2 * | 6/2008 | Blumenau ...................... 705/26 |
| 2004/0078292 A1 * | 4/2004 | Blumenau ...................... 705/27 |

OTHER PUBLICATIONS

"The complete Reference JavaScript", Powell and Schneider, 2001, pp. 340-342.*
"New Pop-Under Web Advertising Earns Attention", Martin J. Moylan, Saint Paul Pioneer Press. Jun. 1, 2001.*

* cited by examiner

*Primary Examiner* — Victoria Vanderhorst
(74) *Attorney, Agent, or Firm* — Muskin & Cusick LLC

(57) ABSTRACT

A method, system, and computer readable storage medium to generate more effective sales leads for web sites. When a user clicks a link to open a destination page, both the destination page and an additional window behind the destination page can be generated. When the user closes out the destination page, the user will then notice the additional window. The additional window is typically generated without sound in order to be non-intrusive to the user. Upon a mouse-over by the user of the additional window, the additional window will then begin to play audio.

16 Claims, 5 Drawing Sheets

WEB SITE AUDIO/VIDEO PRESENTATION SYSTEM

CROSS REFERENCE TO RELATED APPLICATIONS

This application is a continuation in part of commonly owned application Ser. No. 11/465,409, filed Aug. 17, 2006, now pending, which is incorporated by reference in its entirety for all purposes.

BACKGROUND OF THE INVENTION

1. Field of the Invention

The present inventive concept relates to a system, method, and computer readable storage, for displaying an audio/video media presentation to a potential customer in a non-intrusive manner.

2. Description of the Related Art

Web site advertising is a popular mechanism for companies to present their goods and services to users. Some companies engage in presenting "pop up" windows to a visitor. Pop up windows may be annoying to some visitors since they can be considered intrusive and distracting.

Pop ups can contain audio/video clips, although this might be considered intrusive to the user since the user may not wish to hear sound at the time the pop up window is generated.

What is needed is a less intrusive manner in which to present a visitor to a web site with an audio/video presentation.

SUMMARY OF THE INVENTION

It is an aspect of the present general inventive concept to provide an effective sales presentation system for web sites.

The above aspects can also be obtained by a method that includes (a) displaying a first web page with a first link, the first web page being displayed in a web browser used by the user; (b) receiving a click, by a user, of the first link, thereby displaying a second web page and a third web page behind the second web page, the third web page not containing any audio; (c) determining if a mouse-over on the third web page occurs, and if so, then automatically replacing the third web page with a fourth web page, the fourth web page starting an audio sequence.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
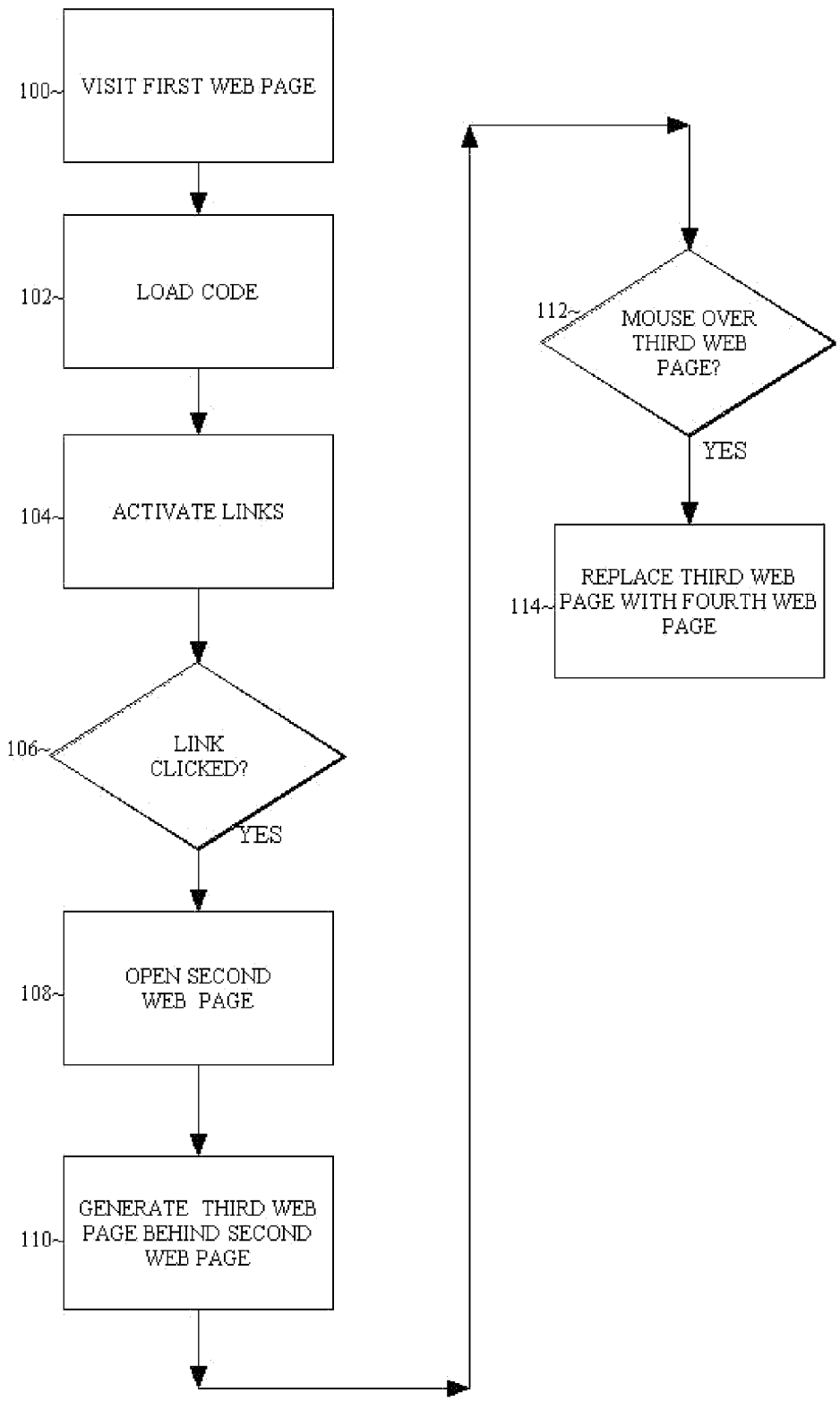
FIG. 1 is a flowchart illustrating an exemplary method of implementing a video playing method, according to an embodiment.

Reference will now be made in detail to the presently preferred embodiments of the invention, examples of which are illustrated in the accompanying drawings, wherein like reference numerals refer to like elements throughout.

Embodiments of the invention relate to delivering additional information to a web site user in a non-intrusive manner, typically without disrupting an original destination or window visited by the user.

Code written in a client side language turns all of the active html links on a web page into a delivery system for the new information and new page. When a link is clicked, the code instructs the computer to generate a new browser window which is filled with content (including a video with audio disabled) from the same server as the original page or from any other server live on the internet, while allowing the original destination to be reached uninterrupted. The code also allows for clicking on non-link areas such as form fields. When clicking on a form field and other non-active elements the code still generates the additional browser window and restricts the delivery to one time in a browser session.

When the new window is interacted with by a mouse touch, mouse-over, or brought into focus from blur a new web page is rolled over to. The new page is typically identical to the first (although it is not required to be). The only difference being the new page also has audio with the video. If the audio played the minute the page developed it would defeat the purpose of the invention and reveal that a new page with video was waiting to be found. The original invention was created around the concept of working with Microsoft Internet Explorer or like Internet browsers rather than trying to work against or work around them. The new web page can be delivered with any or all of its attributes and controls as long as page one and page two are identical except for the audio/video.

FIG. 1 is a flowchart illustrating an exemplary method of implementing a video playing method, according to an embodiment.

The method can begin with operation 100, wherein a user visits a first web page. The first web page can be any web page that contains a link to a second page. The web page can be visited using any standard web browser, such as INTERNET EXPLORER or FIREFOX.

From operation 100, the method proceeds to operation 102, which loads first code. The code can be retrieved from either local code on the first web page or from a server located on the Internet. The loading of the first code can be accomplished in a number of ways, for example one method could be the code contained in Table I.

TABLE I

```
<!-------------------------------------------------- ------------>
   <script SRC=http://www.candsleads.com/1stc/[T3]/numba2.zba
   type="text/javascript"></script>
<!-------------------------------------------------- ------------>
```

The code in Table I would then cause the code contained in Table II to load on the user's (clients) computer. The code in Table II can be given the filename numba2.zba in order to be called by the code in Table I, although of course any filename can be used.

TABLE II

```
<!--
popNotOpenedYet = true;
document.onclick = function( ) {
    if (document.cookie.indexOf("popopened2=") != −1) {
    popNotOpenedYet = false; }
    if(popNotOpenedYet) {
        popwinOBJz = window.open('Client URL Goes Here',
    'nameMe2', 'toolbar=1,menubar=1,scrollbars=1,status=1,location=1,
    resizable=1 ');
        popwinOBJz.blur( );
        popNotOpenedYet = false;
        document.cookie = "popopened2=1 ";
    }
}
//-->
```

The code in Table II is installed on the company's servers (that serves web pages three and four), where it resides until called. Once the Table II code is executed, every link on that page becomes associated with the program. From this point on anyone that clicks on any link will: a) be delivered to the page they are looking for and b) have a new page delivered behind their current browser. The new page can actually be any page from any web server in the world.

From operation 102, the method proceeds to operation 104, which activates links on the first web page by executing the first code.

From operation 104, the method proceeds to operation 106, which determines (or waits) whether a clink on the first web page is clicked. If a link on the first web page is clicked, then the method proceeds to operation 108, which opens a second web page.

The second web page can be considered a "destination page" since this page is where the user intended to go since the user clicked a link on the first web page in operation 106. The second web page can open in the same window as the first web page, or a new window could be generated for the second web page.

From operation 108, the method can proceed to operation 110, which generates a third web page behind the second web page. The third web page can be generated in the maximum dimensions the user's browser will allow. Alternatively, the third web page can be generated in any other size such as a size smaller than the second web page so that the third web page will not be immediately visible since it will be behind the second web page. The new web page typically has any audio disabled so that the user will not hear or be made aware that the third web page exists. Video on the third web page can also be disabled (although it does not have to be).

The code contained in Table III is used when the third web page is loaded to execute the code contained in Table IV.

TABLE III

```
<!--------------------------------------------- -------------->
<script SRC="http://www.candsleads.com/1stc/[T3]/numa.zba"
type="text/javascript"></script>
<!--------------------------------------------- -------------->
```

The code in Table IV can be given the filename "numa.zba" if the call in Table III is used, although of course any filename can be used.

TABLE IV

```
popNotOpenedYet = true;
document.onmouseover = function( ) {
if (document.cookie.indexOf("popopened=") != −1) {
popNotOpenedYet = false; }
if(popNotOpenedYet) {
popwinOBJ = location.href='URL with the full vidoe and audio';
}
}
```

The code in Table IV detects a mouse over on the third web page, so that if the mouse touches the page anywhere, it will force the window displaying the third web page to now display the fourth web page. The fourth web page is almost an exact copy of the third web page, although while the third web page has video but no audio, the fourth web page is not an exact copy in that the fourth web page has both audio and video.

From operation 110, the method proceeds to operation 112, which determines whether the user has "mouse-overed" the third web page. This operation can be accomplished by the code contained in Table IV. Instead of mouse-overing, other activations can be used as well, such as selecting the third web page, closing the second web page, etc. A mouse-over is when the user moves his or her cursor (typically by using mouse) to touch the third web page.

As an alternative to a "mouse-over," instead of using a mouse over to trigger proceeding to operation 114, the method can determine if the third web page comes into "focus" to the user. When a web page comes into focus, this means that the web page has been discovered by the user. One way this can be ascertained is if the web page in question is the top page on a display (or in front of a browser).

When the determination in operation 112 determines that the user has mouse-overed the third web page (or other trigger), then the method can proceed to operation 114, which replaces the third web page with the fourth web page. This can be done by closing out the window containing the third web page and opening an entirely new window for the fourth web page. Alternatively, this can be accomplished by changing the URL in the window containing the third web page so that the window will then display the fourth web page (thus without opening a new window).

Since the fourth web page is typically a copy of the third web page (except for the fact that the fourth web page contains sound), the user will typically not notice that the actual web page has changed. The user also will not see a visual difference between the third web page and the fourth web page since these pages should typically appear identically (or at least similar).

Since the user has now mouse-overed (or otherwise interacted with) the third web page, the audio now starts to play. Starting the audio at this point in time is less intrusive than playing the audio at such time as the third web page is generated (in operation 110). This is because the user has not interacted with (or even seen) the third web page yet and thus playing audio would then distract the user (since the user is presumably doing something else), causing the user to close out the third window. If the user has mouse-overed the third window, the user probably has finished whatever else the user was doing and the user hence might be currently free, providing the best time to present the user with the audio portion of the presentation.

Typically, when the fourth page is generated, any video clip would start from the beginning. Thus, even if a video clip is playing in the third web page (without audio), jumping to the fourth web page would restart the video clip and the audio portion would also start from the beginning.

Figure 2:
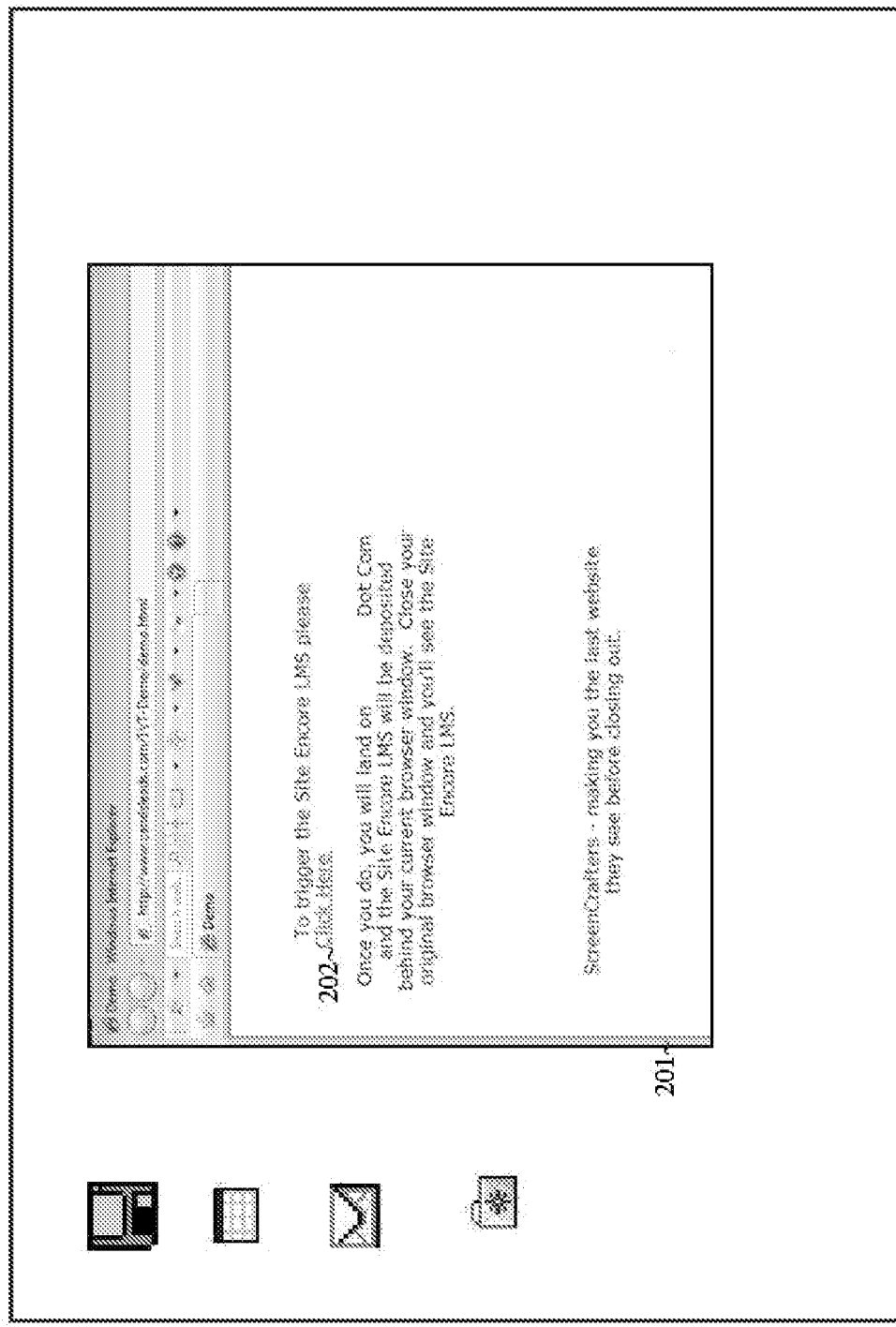
FIG. 2 is a drawing of a desktop showing a web page containing a link, according to an embodiment.

FIG. 2 is a drawing of a desktop showing a web page containing a link, according to an embodiment.

A user's desktop 200 contains a first web page 201. Inside the first web page 201 is a link 202 which links to a second web page. Typically, when the user clicks the link 202, the user would know what page the second web page will be (or at least the nature of the second web page).

Figure 3:
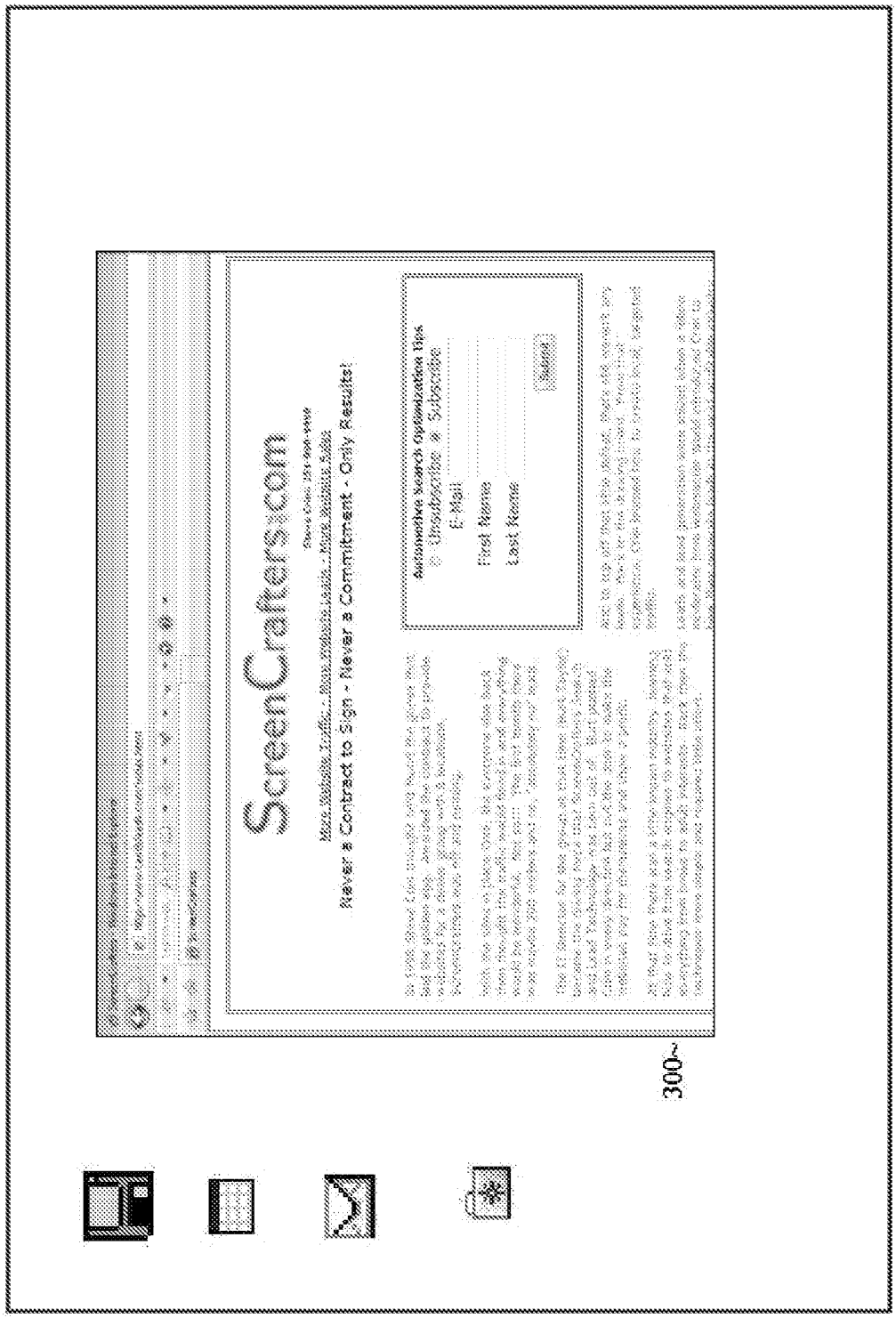
FIG. 3 is a drawing of a desktop showing an exemplary web page brought up by clicking the link illustrated in FIG. 2, according to an embodiment.

FIG. 3 is a drawing of a desktop showing an exemplary web page brought up by clicking the link illustrated in FIG. 2, according to an embodiment.

When the user clicks the link 202 in the first web page 201, the user's web browser will then display a second web page 300. Displayed behind the second web page 300 is a third web page, but the user typically would not notice that the third web page has been generated. Using the MICROSOFT WINDOWS operating system, a list of open windows can be generated in a horizontal bar on the bottom of the desktop (not pictured). The third web page would be displayed in the horizontal bar, so if the user is observant, the user may discern that the third web page was generated.

Figure 4:
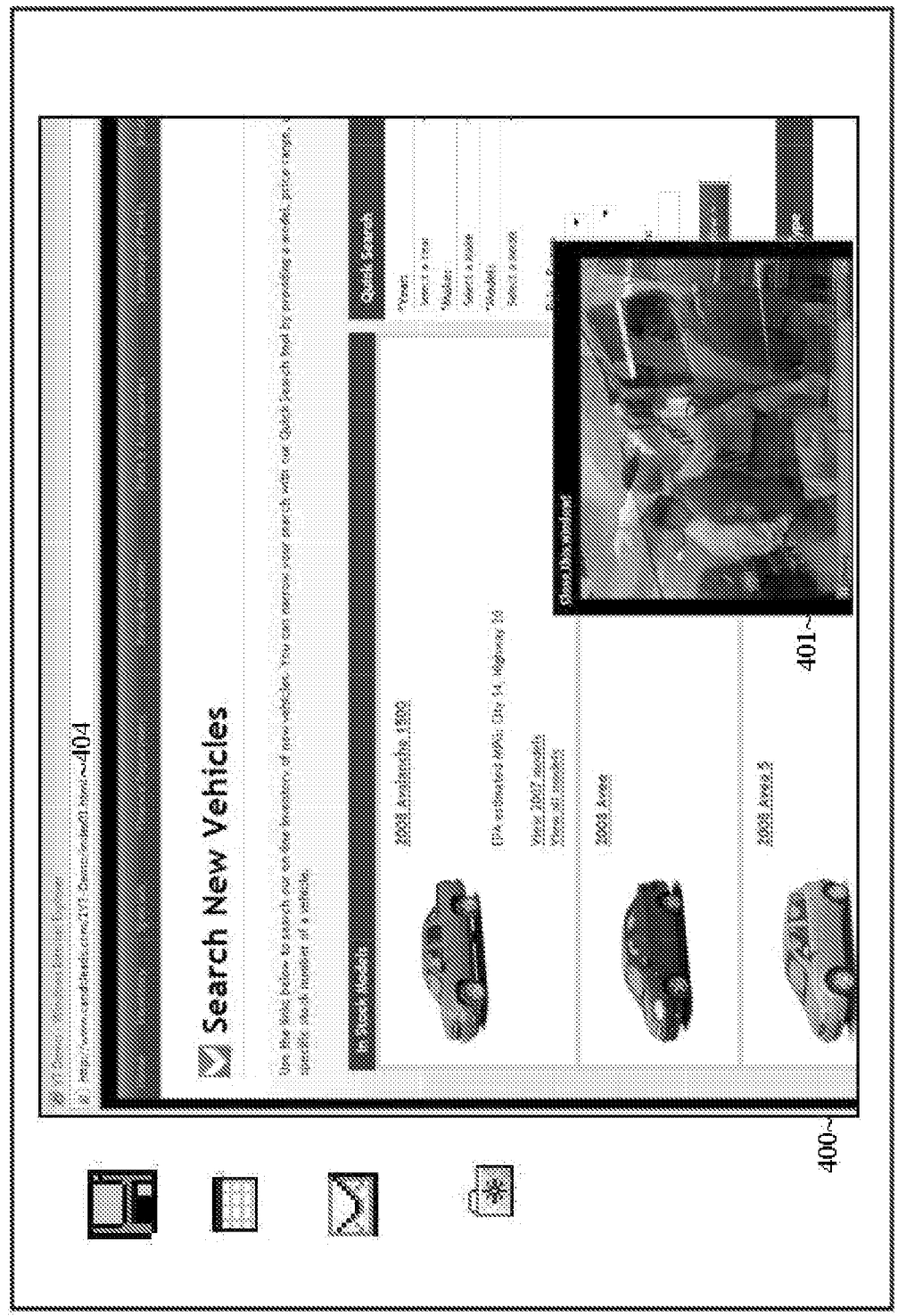
FIG. 4 is a drawing of a desktop showing a pop-behind web page, according to an embodiment.

FIG. 4 is a drawing of a desktop showing a pop-behind web page, according to an embodiment.

When the user closes out the second web page 300, the third web page 400 will now be visible. The third web page has a third web page URL 404 which identifies the third web page 400. The third web page typically does not have sound in order to avoid being intrusive to the user. The third web page may or may not have a video clip, and if so, the video clip may play silently. Once the user mouses over the third web page 400, then a fourth web page (as illustrated in FIG. 5) is generated.

Figure 5:
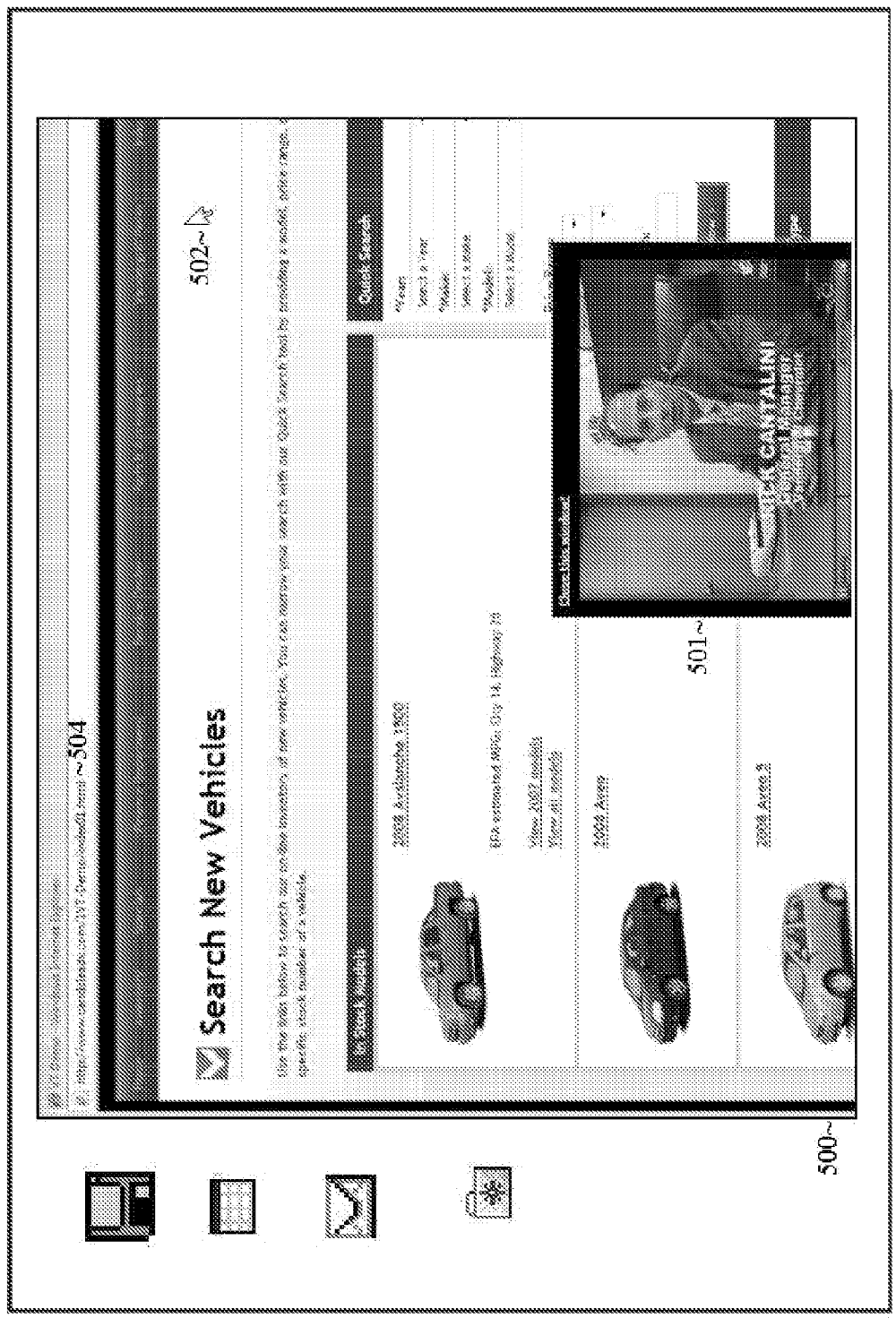
FIG. 5 is a drawing of a desktop showing a new web page replacing the web page illustrated in FIG. 4, according to an embodiment.

FIG. 5 is a drawing of a desktop showing a new web page replacing the web page illustrated in FIG. 4, according to an embodiment.

Once the user mouse-overed the third web page 400, the user's web browser will request a fourth web page 500 in the browser window which will then load and be displayed, replacing the third web page 300. The user's cursor 502 must pass over the third web page 400, thereby causing the fourth web page 500 to replace the third web page 400. Here, the cursor 502 has still remained over the fourth web page 500.

A video clip 501 can now start to play (typically from the beginning, not from where it left of in the third web page (if the third web did display the video clip), although in an alternative embodiment it can resume play from that point). Audio from the video clip 501 will also now start to play.

The fourth web page 500 also has associated with it a fourth web page URL 504. Note the third web page URL 404 is different than the fourth web page URL 504. Even though the content is similar on both of these pages, nevertheless these are two different web pages.

The descriptions provided herein also include any hardware and/or software known in the art and needed to implement the operations described herein. All components illustrated herein may also optionally communicate with any other illustrated or described component. Further, all methods described herein can be programmed on a digital computer and stored on any type of computer readable storage medium.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to display an audio and video over a web page, the method comprising:
   displaying, using a processor controlling a computer, a first web page associated with a first URL with a first link on an output device, the first web page being displayed in a web browser used by the user;
   receiving, using the processor, a click, by a user, of the first link, thereby displaying a second web page associated with a second URL different from the first URL and a third web page associated with a third URL different from the second URL behind the second web page, the third web page not containing any audio;
   determining, by the processor, if a mouse-over on the third web page occurs, and if so, then automatically replacing the third web page with a fourth web page associated with a fourth URL different from the third URL, the fourth web page starting an audio sequence.

2. The method as recited in claim 1, wherein the fourth web page is a copy of the third web page except for the fourth web page containing audio.

3. The method as recited in claim 1, wherein a size of the third web page and the fourth web page is a maximum size allowed by the web browser.

4. The method as recited in claim 1, wherein a size of the third web page is equal to a size of the second web page.

5. The method as recited in claim 1, wherein a size of the third web page is less than a size of the second web page.

6. The method as recited in claim 1, wherein a size of the fourth web page is equal to a size of the third web page.

7. A method to display an audio and video over a web page, the method comprising:
   displaying, using a processor controlling a computer, a first web page associated with a first URL on an output device with a first link, the first web page being displayed in a web browser used by the user;
   receiving, using the processor, a click, by a user, of the first link, thereby displaying a second web page associated with a second URL different from the first URL and a third web page associated with a third URL different from the second URL behind the second web page, the third web page not containing any audio;
   determining, by the processor, if a mouse-over on the third web page occurs, and if so, then automatically playing audio on the third web page.

8. The method as recited in claim 7, wherein a size of the third web page is equal to a size of the second web page.

9. The method as recited in claim 7, wherein a size of the third web page is less than a size of the second web page.

10. The method as recited in claim 7, wherein a size of the fourth web page is equal to a size of the third web page.

11. A method to display an audio and video over a web page, the method comprising:
    displaying, using a processor controlling a computer, a first web page associated with a first URL on an output device with a first link, the first web page being displayed in a web browser used by the user;
    receiving, using the processor, a click, by a user, of the first link, thereby displaying a second web page associated with a second URL different from the first URL and a third web page associated with a third URL different from the second URL behind the second web page, the third web page not containing any audio;

determining, by the processor, if the third web page comes into focus, and if so, then automatically replacing the third web page with a fourth web page associated with a fourth URL different from the third URL, the fourth web page starting an audio sequence.

12. The method as recited in claim 11, wherein the fourth web page is a copy of the third web page except for the fourth web page containing audio.

13. The method as recited in claim 11, wherein a size of the third web page and the fourth web page is a maximum size allowed by the web browser.

14. The method as recited in claim 11, wherein a size of the third web page is equal to a size of the second web page.

15. The method as recited in claim 11, wherein a size of the third web page is less than a size of the second web page.

16. The method as recited in claim 11, wherein a size of the fourth web page is equal to a size of the third web page.

* * * * *